(12) United States Patent
Long et al.

(10) Patent No.: US 8,401,752 B2
(45) Date of Patent: Mar. 19, 2013

(54) FAIL-TO-NEUTRAL SYSTEM AND METHOD FOR A TOROIDAL TRACTION DRIVE AUTOMATIC TRANSMISSION

(75) Inventors: Charles F. Long, Pittsboro, IN (US); Darren J. Weber, Indianapolis, IN (US); John William Edward Fuller, Preston Lancashire (GB)

(73) Assignee: Allison Transmission, Inc., Indianapolis, IN (US)

( * ) Notice: Subject to any disclaimer, the term of this patent is extended or adjusted under 35 U.S.C. 154(b) by 183 days.

(21) Appl. No.: 12/957,885

(22) Filed: Dec. 1, 2010

(65) Prior Publication Data

US 2011/0144870 A1 Jun. 16, 2011

Related U.S. Application Data (60) Provisional application No. 61/287,045, filed on Dec. 16, 2009.

(51) Int. Cl.
*G06F 7/00* (2006.01)
*G06F 17/00* (2006.01)
*G06F 19/00* (2006.01)

(52) U.S. Cl. ............. 701/62; 701/51; 701/63; 701/29.1; 701/30.9; 701/31.1; 477/39; 477/62; 477/70; 477/79; 477/86

(58) Field of Classification Search .................. 701/29.1, 701/29.7, 30.5, 30.6, 30.7, 30.8, 30.9, 31.1, 701/36, 51, 55, 56, 62, 63; 477/39, 57, 62, 477/63, 70, 74, 77, 79, 83, 86, 87, 166, 171, 477/179, 180; 475/86, 95, 100; 476/2, 25
See application file for complete search history.

(56) References Cited

U.S. PATENT DOCUMENTS

| 4,922,788 A | 5/1990 | Greenwood |
| 5,090,951 A | 2/1992 | Greenwood |
| 5,217,418 A | 6/1993 | Fellows et al. |
| 5,232,414 A | 8/1993 | Fellows et al. |
| 5,242,337 A | 9/1993 | Greenwood |
| 5,263,907 A | 11/1993 | Fellows |
| 5,308,297 A | 5/1994 | Greenwood |

(Continued)

FOREIGN PATENT DOCUMENTS

| GB | 2361510 | 10/2001 |
| GB | 2368618 | 5/2002 |

(Continued)

OTHER PUBLICATIONS

International Search Report and the Written Opinion for International Application No. PCT/US2010/058704, dated Feb. 2, 2011, (7 pages).

*Primary Examiner* — Thomas Tarcza
*Assistant Examiner* — Rami Khatib
(74) *Attorney, Agent, or Firm* — Barnes & Thornburg LLP (57) ABSTRACT

A fail-to-neutral diagnostic technique for a transmission that includes a variator may include monitoring a state of a pressure differential valve fluidly coupled to a high side pressure applied to at least one actuator coupled to at least one corresponding roller of the variator and also fluidly coupled to a low side pressure applied to the at least one actuator, determining from the state of the pressure differential valve a variator torque sign corresponding to whether torque transferred by the at least one roller is positive or negative, determining an expected variator torque sign based on current operating conditions of the transmission, and commanding the transmission to a true neutral condition if the determined variator torque sign is different from the expected variator torque sign.

12 Claims, 6 Drawing Sheets

U.S. PATENT DOCUMENTS

| | | | |
|---|---|---|---|
| 5,308,298 | A | 5/1994 | Lambert |
| 5,316,526 | A | 5/1994 | Fellows |
| 5,338,268 | A | 8/1994 | Greenwood |
| 5,395,292 | A | 3/1995 | Fellows et al. |
| 5,401,221 | A | 3/1995 | Fellows et al. |
| 5,423,727 | A | 6/1995 | Fellows |
| 5,453,061 | A | 9/1995 | Fellows |
| 5,521,819 | A | 5/1996 | Greenwood |
| 5,564,993 | A | 10/1996 | Robinson |
| 5,564,998 | A | 10/1996 | Fellows |
| 5,643,121 | A | 7/1997 | Greenwood et al. |
| 5,667,456 | A | 9/1997 | Fellows |
| 5,766,105 | A | 6/1998 | Fellows et al. |
| 5,820,508 | A | 10/1998 | Konig et al. |
| 5,820,513 | A | 10/1998 | Greenwood |
| 5,895,337 | A | 4/1999 | Fellows et al. |
| 5,938,557 | A | 8/1999 | Greenwood |
| 5,971,885 | A | 10/1999 | Greenwood et al. |
| 5,980,420 | A | 11/1999 | Sakamoto et al. |
| 6,030,310 | A | 2/2000 | Greenwood et al. |
| 6,066,067 | A | 5/2000 | Greenwood |
| 6,071,209 | A | 6/2000 | Greenwood |
| 6,273,839 | B1 | 8/2001 | Dutson |
| 6,306,060 | B1 | 10/2001 | Dutson et al. |
| 6,312,356 | B1 | 11/2001 | Greenwood |
| 6,464,614 | B2 | 10/2002 | Dutson |
| 6,595,896 | B1 | 7/2003 | Gierling |
| 6,626,793 | B1 | 9/2003 | Greenwood |
| 6,666,791 | B1 | 12/2003 | Greenwood |
| 6,931,316 | B2 | 8/2005 | Joe et al. |
| 6,979,276 | B2 | 12/2005 | Murray |
| 7,018,320 | B2 | 3/2006 | Robinson et al. |
| 7,056,261 | B2 | 6/2006 | Fuller |
| 7,160,226 | B2 | 1/2007 | Fuller |
| 7,278,951 | B2 | 10/2007 | Fuller |
| 7,285,066 | B2 | 10/2007 | Long et al. |
| 7,288,039 | B2 | 10/2007 | Foster et al. |
| 7,318,786 | B2 * | 1/2008 | Greenwood et al. ............ 476/10 |
| 7,322,899 | B1 | 1/2008 | Long et al. |
| 7,407,459 | B2 | 8/2008 | Greenwood et al. |
| 7,491,149 | B2 | 2/2009 | Greenwood et al. |
| 7,530,916 | B2 | 5/2009 | Greenwood |
| 7,563,194 | B2 | 7/2009 | Murray |
| 7,614,973 | B2 | 11/2009 | Parthuisot et al. |
| 7,625,309 | B2 | 12/2009 | Fuller |
| 7,632,208 | B2 | 12/2009 | Greenwood et al. |
| 7,637,841 | B2 | 12/2009 | Dutson |
| 7,651,427 | B2 | 1/2010 | Long et al. |
| 7,951,034 | B2 * | 5/2011 | Shimizu et al. ............... 475/120 |
| 7,951,041 | B2 | 5/2011 | Dutson |
| 7,955,210 | B2 | 6/2011 | Greenwood et al. |
| 8,100,804 | B2 * | 1/2012 | Nishimine et al. ............ 475/131 |
| 2004/0038773 | A1 | 2/2004 | Robinson et al. |
| 2005/0143216 | A1 | 6/2005 | Greenwood et al. |
| 2005/0176547 | A1 | 8/2005 | DeFreitas |
| 2006/0142110 | A1 | 6/2006 | Greenwood et al. |
| 2006/0160656 | A1 | 7/2006 | Dutson |
| 2007/0072736 | A1 | 3/2007 | Defreitas et al. |
| 2007/0112495 | A1 | 5/2007 | Murray |
| 2007/0117671 | A1 | 5/2007 | Long et al. |
| 2007/0142163 | A1 | 6/2007 | Murray |
| 2007/0275817 | A1 | 11/2007 | Newall |
| 2008/0146399 | A1 | 6/2008 | Oliver et al. |
| 2008/0153659 | A1 | 6/2008 | Greenwood |
| 2008/0269001 | A1 | 10/2008 | Greenwood et al. |
| 2009/0048054 | A1 | 2/2009 | Tsuchiya et al. |
| 2009/0062065 | A1 | 3/2009 | Field et al. |
| 2009/0071777 | A1 | 3/2009 | Weber et al. |
| 2009/0075772 | A1 | 3/2009 | Ellis et al. |
| 2009/0203486 | A1 | 8/2009 | Murray |
| 2009/0305840 | A1 | 12/2009 | Oliver |
| 2011/0028270 | A1 | 2/2011 | Long et al. |
| 2011/0125360 | A1 * | 5/2011 | Kariya et al. .................... 701/29 |

FOREIGN PATENT DOCUMENTS

| | | |
|---|---|---|
| GB | 2384531 | 7/2003 |
| GB | 2397630 | 7/2004 |
| GB | 2410302 | 7/2005 |
| GB | 2418235 | 3/2006 |
| GB | 2438412 | 11/2007 |
| GB | 2440746 | 2/2008 |
| GB | 2455030 | 6/2009 |
| GB | 2459857 | 11/2009 |
| GB | 2460237 | 11/2009 |
| GB | 2470717 | 12/2010 |
| GB | 2474870 | 5/2011 |

* cited by examiner

FIG. 9 with spanning cells...

FAIL-TO-NEUTRAL SYSTEM AND METHOD FOR A TOROIDAL TRACTION DRIVE AUTOMATIC TRANSMISSION

CROSS-REFERENCE TO RELATED APPLICATION

This patent application claims priority to, and the benefit of, U.S. Patent Application Ser. No. 61/287,045, filed Dec. 16, 2009, the disclosure of which is incorporated herein by reference.

FIELD OF THE INVENTION

The present invention relates generally to toroidal traction drive automatic transmissions including a variator, and more specifically to systems and methods for automatically controlling the transmission to a neutral state upon detection of variator and/or clutch related failures.

BACKGROUND

Toroidal traction drive automatic transmissions may include a variator, one or more gear sets and a number of selectively engageable friction devices that cooperate together to transfer drive torque from a power plant to one or more loads. It is desirable to monitor operation of one or more of these devices and to command the transmission to a neutral state upon detection of one or more specified faults or failure conditions.

SUMMARY

The present invention may comprise one or more of the features recited in the attached claims, and/or one or more of the following features and combinations thereof. A fail-to-neutral diagnostic method for a transmission including a variator may comprise monitoring a state of a pressure differential valve fluidly coupled to a high side pressure applied to at least one actuator coupled to at least one corresponding roller of the variator and also fluidly coupled to a low side pressure applied to the at least one actuator, determining from the state of the pressure differential valve a variator torque sign corresponding to whether torque transferred by the at least one roller is positive or negative, determining an expected variator torque sign based on current operating conditions of the transmission, and commanding the transmission to a true neutral condition if the determined variator torque sign is different from the expected variator torque sign.

The pressure differential valve may comprise a spool having one end fluidly coupled to the high-side pressure and an opposite end fluidly coupled to the low-side pressure. The variator torque sign may have one value when the high-side pressure is sufficiently greater than the low-side pressure and may have an opposite value when the low-side pressure is sufficiently greater than the high-side pressure. Determining from the state of the pressure differential valve a variator torque sign may comprise determining the variator torque sign based on a position of the spool relative to the pressure differential valve and. A pressure switch may be fluidly coupled to the pressure differential valve, and may be configured to assume one state when the high-side pressure is sufficiently greater than the low-side pressure to cause the spool to move to one extreme relative to the pressure differential valve, and to assume an opposite state when the low-side pressure is sufficiently greater than the high-side pressure to cause the spool to move to an opposite extreme relative to the pressure differential valve. Determining from the state of the pressure differential valve a variator torque sign may comprise determining the variator torque sign from the state of the pressure switch. The variator torque sign may have one value when the pressure switch has assumed the one state and may have an opposite value when the pressure switch has assumed the opposite state. The expected variator torque sign may have the one value if the pressure switch is expected to be in the one state, and may have the opposite value if the pressure switch is expected to be in the opposite state. Commanding the transmission to a true neutral condition may comprise commanding the transmission to the true neutral condition if the variator torque sign is the one value and the expected variator torque sign is the opposite value, and if the variator torque sign is the opposite value and the expected variator torque sign is the one value.

The method may further comprise logging a fault code in a memory unit if the determined variator torque sign is different from the expected variator torque sign.

A fail-to-neutral diagnostic system for a transmission including a variator may comprise a pressure differential valve fluidly coupled to a high side pressure applied to at least one actuator coupled to the variator and also fluidly coupled to a low side pressure applied to the at least one actuator, a pressure switch fluidly coupled to the pressure differential valve and configured to assume one of two opposite states depending upon which of the high-side and low-side pressures is greater than the other, and a control circuit. The control circuit may include a memory having instructions stored therein that are executable by the control circuit to determine from current operating conditions of the transmission an expected state of the pressure switch, to determine an actual state of the pressure switch and to command the transmission to a true neutral condition if the actual state of the pressure is different from the expected state of the pressure switch.

The pressure switch may be configured to assume one state if the high-side pressure is sufficiently greater than the low-side pressure and to assume an opposite state if the low-side pressure is sufficiently greater than the high-side pressure. The instructions stored in the memory may include instructions that are executable by the control circuit to determine that the expected state of the pressure switch is the one state if the high-side pressure is expected to be sufficiently greater than the low-side pressure and is the opposite state if the low-side pressure is expected to be sufficiently greater than the high-side pressure. The instructions stored in the memory may further include instructions that are executable by the control circuit to command the neutral state if the pressure switch has assumed the one state and the expected state of the pressure switch is the opposite state, and to command the neutral state if the pressure switch has assumed the opposite state and the expected state of the pressure switch is the one state. The instructions stored in the memory may further include instructions that are executable by the control circuit to log a fault code in a memory unit if the determined actual state of the pressure switch is different from the expected state of the pressure switch.

A fail-to-neutral diagnostic method for a transmission including a variator may comprise monitoring operating states of a plurality of clutch control valves each fluidly coupled to a corresponding gear engagement clutch of the transmission, determining expected operating states of each of the plurality of clutch control valves based on current operating conditions of the transmission, and forcing the transmission to a true neutral condition if a monitored operating state of at least one of the plurality of clutch control valves is different from a corresponding one of the expected operating states.

The transmission may have a plurality of operating modes each operable in a different road speed ranges of a vehicle carrying the transmission. Determining expected operating states of each of the plurality of clutch control valves may comprise determining which of the plurality of operating modes the transmission is currently operating in, and determining the expected operating states of each of the plurality of clutch control valves for the current operating mode of the transmission based on the current operating conditions of the transmission. The method may further comprise a plurality of pressure switches each fluidly coupled to a different one of the plurality of clutch control valves and each configured to assume an operating state depending upon the operating state of a corresponding one of the plurality of clutch control valves. Monitoring operating states of a plurality of clutch control valves may comprise monitoring operating states of each of the plurality of pressure switches. Determining expected operating states of each of the plurality of clutch control valves may comprise determining expected operating states of each of the plurality of pressure switches.

The method may further comprise logging a fault code in a memory unit if a monitored operating state of at least one of the plurality of clutch control valves is different from a corresponding one of the expected operating states. Logging a fault code may comprise including in the fault code information indicative of a current one of a plurality of different operating modes of the transmission. Logging a fault code may further comprise including in the fault code information identifying which of the plurality of clutch control valves has a monitored operating state that is different from a corresponding expected operating state.

A fail-to-neutral diagnostic system for a transmission including a variator may comprise a plurality of clutch control valves each fluidly coupled to a corresponding gear engagement clutch of the transmission, a plurality of pressure switches each fluidly coupled to a different one of the plurality of clutch control valves, and a control circuit. The control circuit may include a memory having instructions stored therein that are executable by the control circuit to determine from the plurality of pressure switches actual operating states of each of the plurality of clutch control valves, to determine expected operating states of each of the plurality of clutch control valves based on current operating conditions of the transmission, and to force the transmission to a true neutral condition if an actual operating state of at least one of the plurality of clutch control valves is different from a corresponding one of the expected operating states.

Each of the plurality of pressure switches may be configured to assume an operating state depending upon the operating state of a corresponding one of the plurality of clutch control valves. The instructions stored in the memory may include instructions that are executable by the control circuit to determine from the plurality of pressure switches actual operating states of each of the plurality of clutch control valves by monitoring operating states of each of the plurality of pressure switches, and to determine expected operating states of each of the plurality of clutch control valves by determining expected operating states of each of the plurality of pressure switches. The transmission may have a plurality of operating modes each operable in a different road speed ranges of a vehicle carrying the transmission. The instructions stored in the memory may include instructions that are executable by the control circuit to determine expected operating states of each of the plurality of clutch control valves by determining which of the plurality of operating modes the transmission is currently operating in, and then determining the expected operating states of each of the plurality of clutch control valves for the current operating mode of the transmission based on the current operating conditions of the transmission.

The instructions stored in memory may include instructions that are executable by the control circuit to log a fault code in the memory if an actual operating state of at least one of the plurality of clutch control valves is different from a corresponding one of the expected operating states. The instructions stored in memory may further include instructions that are executable by the control circuit to include in the fault code information indicative of a current one of a plurality of different operating modes of the transmission. The instructions stored in memory may further include instructions that are executable by the control circuit to include in the fault code information identifying which of the plurality of clutch control valves has an actual operating state that is different from a corresponding expected operating state.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
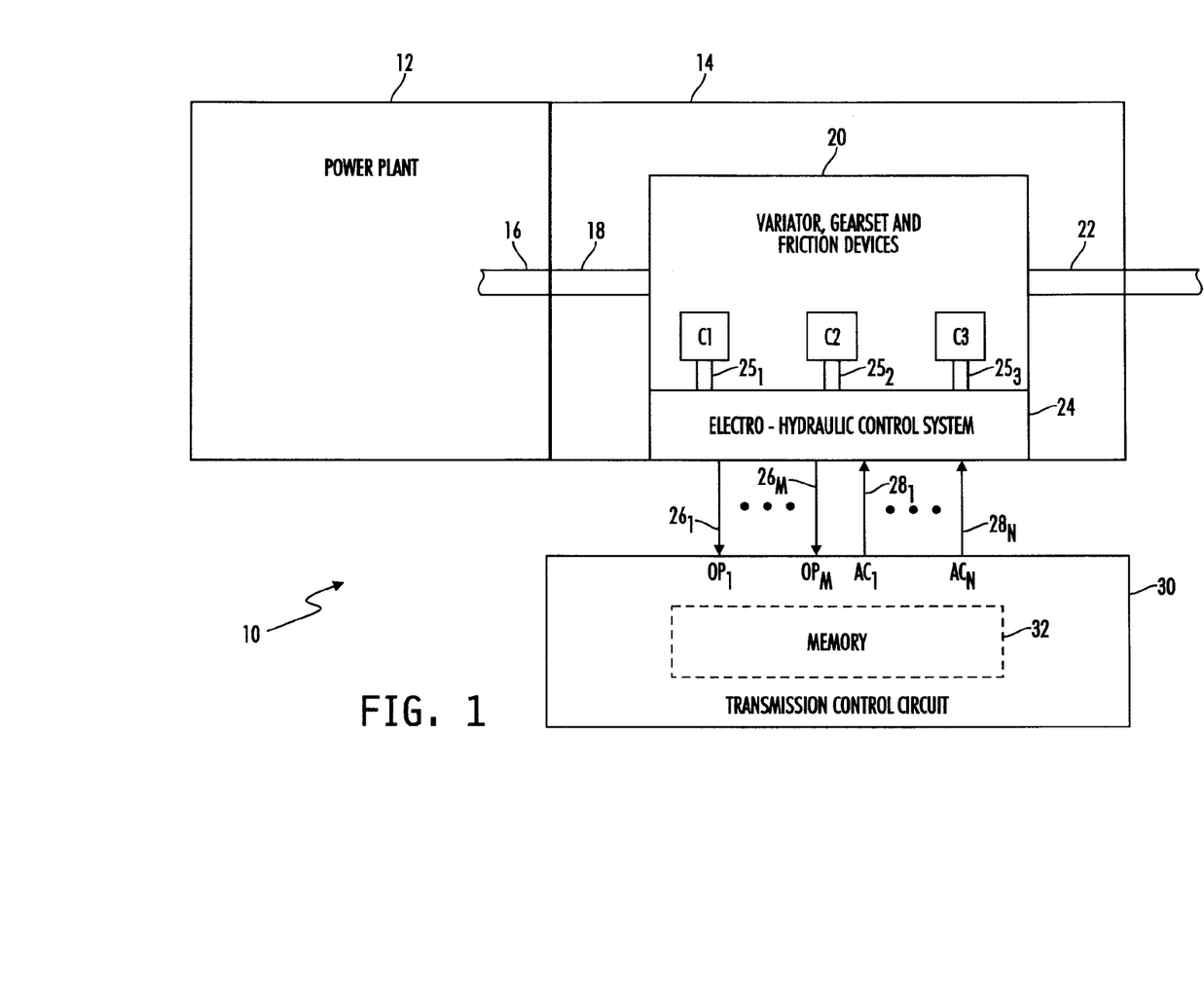
FIG. 1 is a block diagram of one illustrative embodiment of a system for controlling operation of a toroidal traction drive automatic transmission including fail-to-neutral controls.

Referring now to FIG. 1, a block diagram is shown of one illustrative embodiment of a system 10 for controlling operation of a toroidal traction drive automatic transmission 14. In the illustrated embodiment, a power plant or energy center 12 is coupled to an automatic transmission 14 such that a rotatable output shaft 16 of the power plant 12 is coupled to a rotatable input shaft 18 of the transmission 14 in a conventional manner. The input shaft 18 is coupled, in the illustrated embodiment, to a combination variator and gear set 20 that further includes a plurality of selectively engageable friction devices, e.g., one or more conventional, selectively engageable clutches or the like, and an output of the combination variator and gear set 20 is coupled to a rotatable output shaft 22. The combination variator and gear set 20 is illustratively controlled by an electro-hydraulic control system 24, some of the details of which will be described in greater detail hereinafter.

The power plant 12 is generally an apparatus that produces rotational drive power at the output shaft 16. Examples of the power plant 12 include, but should not be limited to, one or any combination of a one or more engines, such as an internal combustion engine of the spark ignited, compression ignition or other variety, a steam engine, or type of engine that produces mechanical energy from one or more other fuel sources, one or more electrical generators, and the like.

Figure 2A:
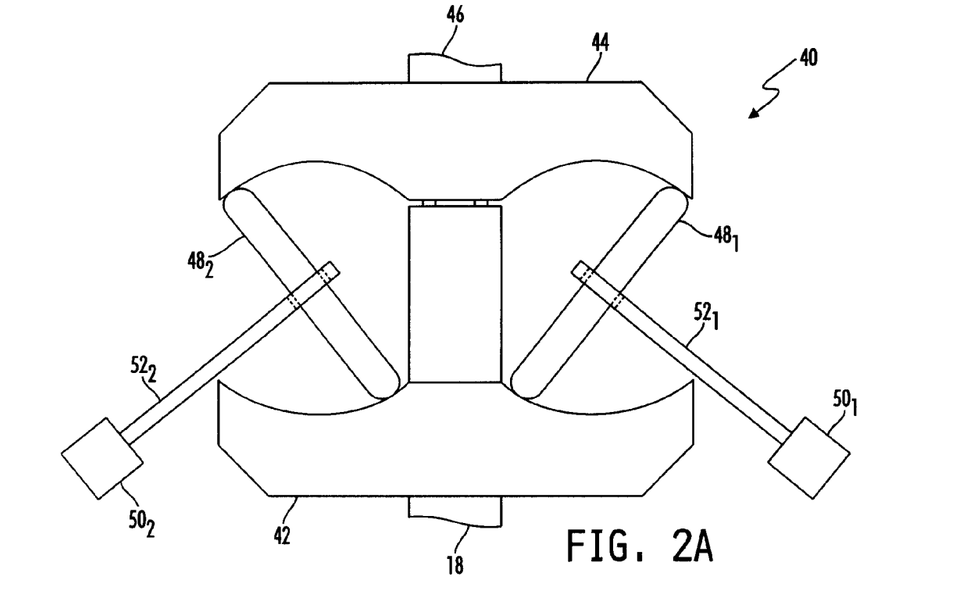
FIG. 2A is a diagram illustrating operation of one illustrative embodiment of a variator that forms part of the toroidal traction drive automatic transmission illustrated in FIG. 1.
Figure 2B:
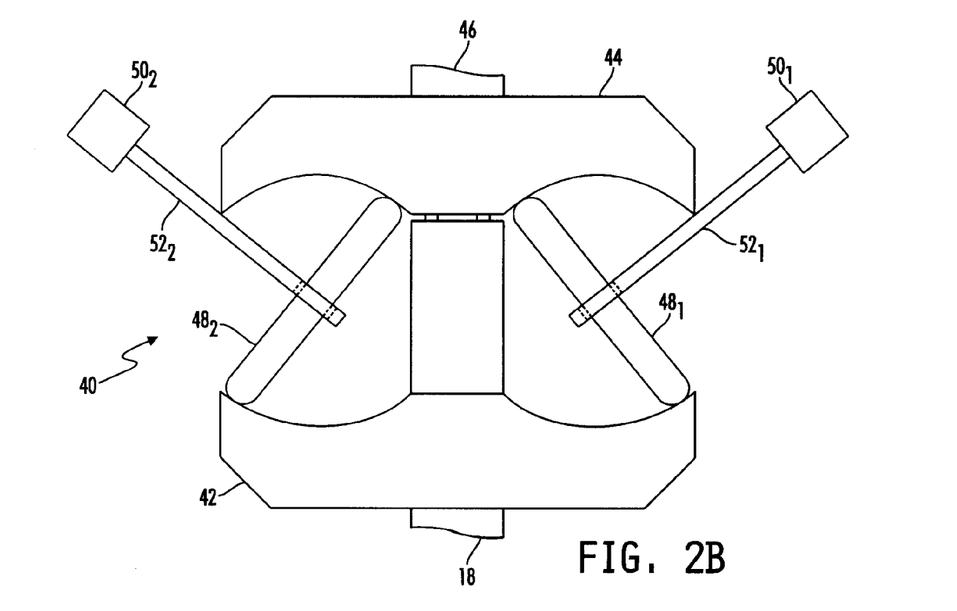
FIG. 2B is a diagram further illustrating operation of the variator of FIG. 2A.

The combination variator and gear set 20 illustratively includes a conventional full-toroidal, traction-drive variator that is coupled to a conventional gear set. Referring to FIGS. 2A and 2B, one illustrative embodiment of some of the structural features of such a full-toroidal, traction-drive variator 40 is shown. In the illustrated embodiment, the variator 40 includes a pair of opposing, toroidal-shaped disks 42 and 44 that rotate independently of each other. For example, the disk 42 is rigidly coupled to the input shaft 18 of the transmission 14 such that the disk 42 is rotatably driven by the power plant 12. The disk 44 is rigidly coupled to an output shaft 46 of the variator 40, and is rotatably coupled to the shaft 18 such that the disk 44 rotates freely about the shaft 18. The output shaft 46 of the variator 40 is coupled directly, or indirectly through one or more transmission gears, to the output shaft 22 of the transmission 14 such that output shaft 46 of the variator 40 drives one or more wheels of a vehicle (not shown) carrying the power plant 12 and transmission 14.

A number of rollers 48 are illustratively positioned between opposing inner, arcuate-shaped surfaces of the disks 42 and 44, and a traction fluid (not shown) is disposed between the rolling surface of each such roller 48 and the inner surfaces of the disks 42 and 44. In the illustrated embodiment, the rolling surfaces of the various rollers 48 therefore do not contact, in a structural sense, the inner surface of either disk 42, 44; rather torque is transmitted by the various rollers 48 between the two disks 42, 44 via the traction fluid. It is because torque is transferred between the two disks 42, 44 via the traction fluid and not via structural contact between the rolling surfaces of the rollers 48 and the arcuate inner surfaces of the disks 42, 44 that the variator is referred to as a traction-drive apparatus.

In the embodiment illustrated in FIGS. 2A and 2B, two such rollers $48_1$ and $48_2$ are shown operatively positioned between the opposing inner surfaces of the two disks 42, 44. A roller actuator $50_1$, e.g., in the form of a conventional hydraulically actuated piston, is coupled to the roller $48_1$ via a bracket $52_1$, and another roller actuator $50_2$, e.g., in the form of another conventional hydraulically actuated piston, is coupled to the roller $48_2$ via a bracket $52_2$. It will be understood that the brackets $52_1$ and $52_2$ do not represent rotatable shafts about which the rollers $48_1$ and $48_2$ may be rotatably driven. Rather, the brackets $52_1$ and $52_2$ represent structures about which the rollers $48_1$ and $48_2$ rotate. In one actual implementation, for example, the brackets $52_1$ and $52_2$ are configured to attach to the central hub of the rollers $48_1$ and $48_2$ on either side thereof such that the brackets $52_1$ and $52_2$ and actuators $50_1$ and $50_2$ would extend generally perpendicular to the page illustrating FIGS. 2A and 2B.

The hydraulically controlled actuators $50_1$ and $50_2$ are each illustratively controllable, by selectively controlling a high-side hydraulic pressure applied to one side of the actuator and a low-side hydraulic pressure applied to the opposite side of the actuator, to thereby control torque transferred from a corresponding roller $48_1$, $48_2$ relative to the inner, annular surfaces of the two disks 42, 44. The actuators $50_1$ and $50_2$ illustratively control driveline torque rather than the position or pitch of the rollers $48_1$ and $48_2$. The rollers $48_1$ and $48_2$ are free-castoring, and are responsive to the actuators $50_1$ and $50_2$ to seek a position that provides the correct ratio match of engine and drive train speeds based on input energy equaling output energy.

In one illustrative implementation, the variator 40 includes two sets of disks 42 and 44, with the pairs of the disks 42 rigidly coupled to each other and with the pairs of the disks 44 also rigidly coupled to each other, such that the embodiment illustrated in FIGS. 2A and 2B represents one-half of such an implementation. In this illustrative implementation, three rollers are positioned between each opposing set of disks 42, 44 for a total of six rollers $48_1$-$48_6$ and six corresponding hydraulically controlled actuators $50_1$-$50_6$. It will be understood, however, that this particular implementation of the variator 40 is shown and described only by way of example, and that other embodiments of the variator 40 that include more or fewer pairs of disks 42, 44, that include more or fewer rollers 48 and hydraulically controlled actuators 50, and/or that are configured to be only partially toroidal in shape, may alternatively be used. It will further be understood that while the operation of the variator 40 illustrated and described herein as being generally hydraulically controlled, this disclosure contemplates embodiments in which operation of the variator 40 is controlled via purely electronic or electro-mechanical structures.

Referring again to FIG. 1, the gear set within the combination variator and gear set 20 illustratively includes one or more conventional planetary gear set(s) and/or other gear set(s) that define(s) at least two automatically selectable gear ratios and that is coupled to, or integrated with, the variator, e.g., the variator 40 illustrated and described with respect to FIG. 2. The combination variator and gear set 20 further illustratively includes a number of conventional friction devices, e.g., clutches, which may be selectively controlled to thereby control shifting of the transmission 14 between the two or more gear ratios. In alternate embodiments, the gear set may include more than one planetary gear set, one or more planetary gear sets in combination with one or more other conventional gear sets, or exclusively one or more non-planetary gear sets.

In the example embodiment illustrated in FIG. 1, the transmission 14 includes three friction devices, e.g., in the form of three conventional clutches C1, C2 and C3. In this embodiment, each clutch C1, C2 and C3 is operated in a conventional manner by fluid pressure under the control of the electro-hydraulic control system 24. In this regard, a fluid path $25_1$ is fluidly coupled between the electro-hydraulic control system 24 and the clutch C1, a fluid path $25_2$ is fluidly coupled between the electro-hydraulic control system 24 and the clutch C2, and a fluid path $25_3$ is fluidly coupled between the electro-hydraulic control system 24 and the clutch C3. The gear set and the clutches C1, C2 and C3 are illustratively arranged to provide four separate modes of operation of the transmission 14, and the various operating mode of the transmission 14 are selectively controlled by the operation of the clutches C1, C2 and C3.

In a first operating mode, M1, for example, the clutch C1 is applied, e.g., engaged, while the clutches C2 and C3 are released, e.g., disengaged, and in this mode forward or reverse launch can be accomplished, and the vehicle carrying the transmission 14 can be operated at vehicle speeds up to about 10 miles per hour. In a second operating mode, M2, as another example, the clutch C2 is engaged while the clutches C1 and C3 are disengaged, and in this mode the vehicle can be operated at vehicle speeds in the range of about 10-30 miles per hour. In a third operating mode, M3, as yet another example, the clutch C3 is engaged while the clutches C1 and C2 are disengaged, and in this mode the vehicle can be operated at vehicle speeds greater than about 30 miles per hour. In a fourth mode, M0, as a final example, the clutches C1, C2 and C3 are all disengaged, and in this mode the transmission 14 is in so-called "true neutral." In the transitional states between the various operating modes M1, M2 and M3, the variator torque is illustratively reversed to assist transitions from one operating mode to the next.

The system 10 further includes a transmission control circuit 30 that controls and manages the overall operation of the transmission 14. The transmission control circuit 30 includes a number, M, of operating parameter inputs, $OP_1$-$OP_M$, that are electrically connected to corresponding operating parameter sensors included within the electro-hydraulic control system 24 via corresponding signal paths $26_1$-$26_M$, wherein M may be any positive integer. The one or more operating parameter sensors included within the electro-hydraulic control system 24, examples of which will be described hereinafter, produce corresponding operating parameter signals on the signal paths $26_1$-$26_M$, which are received by the transmission control circuit 30. The transmission 14 further includes a number, N, of electrically controllable actuators included within the electro-hydraulic control system 24 that are each electrically connected to a different one of a corresponding number of actuator control outputs, $AC_1$-$AC_N$ of the transmission control circuit 30 via corresponding signal paths $28_1$-$28_N$, wherein N may be any positive integer. The one or more electrically controllable actuators included within the electro-hydraulic control system 24, examples of which will be described hereinafter, are responsive to actuator control signals produced by the transmission control circuit 30 on the corresponding signal paths $28_1$-$28_N$ to control various operational features of the transmission 14.

Illustratively, the transmission control circuit 30 is microprocessor-based, and includes a memory unit 32 having instructions stored therein that are executable by the control circuit 30 to control operation of the transmission 14 generally, and more specifically to control operation of the electro-hydraulic control system 24 as will be described herein. It will be understood, however, that this disclosure contemplates other embodiments in which the transmission control circuit 30 is not microprocessor-based, but is configured to control operation of the transmission 14 generally and operation of the electro-hydraulic system 24 more specifically, based on one or more sets of hardwired instructions and/or software instructions stored in the memory unit 32.

Figure 3:
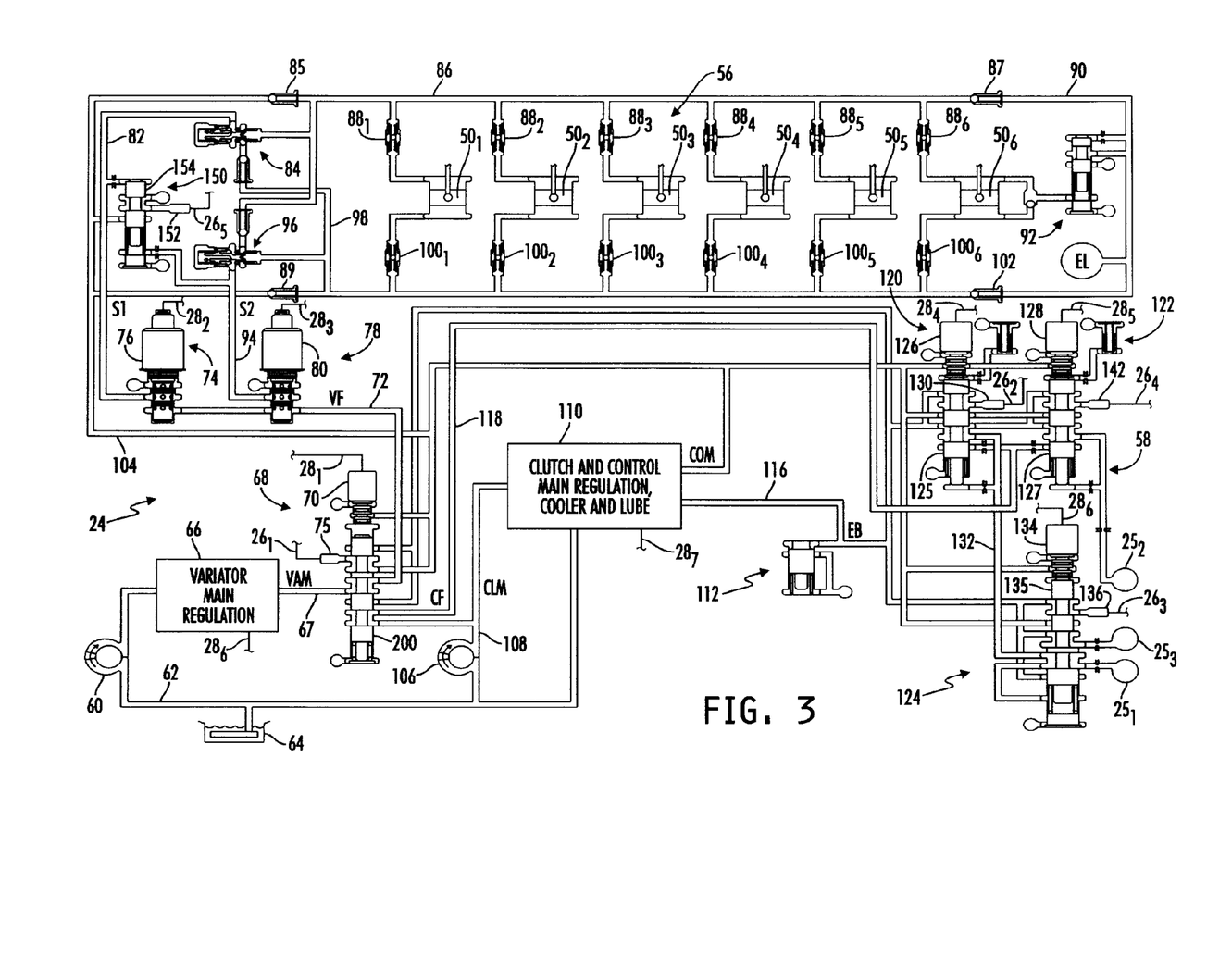
FIG. 3 is a schematic diagram of one illustrative embodiment of the electro-hydraulic control system that forms part of the toroidal traction drive automatic transmission illustrated in FIG. 1.

Referring now to FIG. 3, a schematic diagram is shown of one illustrative embodiment of the electro-hydraulic control system 24 of FIG. 1. In the illustrated embodiment, the electro-hydraulic control system 24 is roughly divided in two separate control sections; a variator control section 56 and a clutch control section 58. A conventional fluid pump 60 is configured to supply transmission fluid, e.g., conventional transmission oil, to the variator control section 56 from a source 64 of transmission fluid, e.g., a conventional transmission sump. In the illustrated embodiment, a fluid inlet of the fluid pump 60 is fluidly coupled to the sump 64 via a fluid passageway 62. A fluid outlet of the pump 60 is fluidly coupled to an inlet of a variator main regulation block 66, and one of the output signal paths $28_6$ of the control circuit 30 is electrically connected to the variator main regulation block 66. The variator main regulation block 66 includes conventional components, e.g., one or more valves, responsive to a control signal produced on the signal path $28_6$ by the transmission control circuit 30 to supply pressure-regulated transmission fluid at a fluid outlet of the block 66 in a conventional manner.

The fluid outlet of the variator main regulation block 66 is fluidly coupled to a fault valve 68 via a variator main fluid path 67 (VAM), and another one of the output signal paths $28_1$ of the control circuit 30 is electrically connected to an electronic actuator 70, e.g., a conventional solenoid, of the fault valve 68. The fault valve 68 is configured to be responsive to a control signal produced on the signal path $28_1$ by the transmission control circuit 30 to control operation of the fault valve 68 between a stroked position and an unstroked position as will be described in greater detail hereinafter. A variator fluid path 72 is fluidly coupled between the fault valve 68 and fluid inlets of two separate variator trim valves 74 and 78. For purposes of this document, the fluid path 72 may be referred to herein as a variator fluid (VF) supply path.

The variator trim valves 74 and 78 each include an actuator 76 and 80 respectively that is electrically connected to the transmission control circuit 30 via a signal path $28_2$ and $28_3$ respectively. A fluid outlet of the variator trim valve 74 is fluidly coupled to a high-side fluid inlet of the variator control section 56 of the electro-hydraulic control system 24 via a fluid path 82, and a fluid outlet of the variator trim valve 78 is fluidly coupled to a low-side fluid inlet of the variator control section 56 of the electro-hydraulic control system 24 via a fluid path 94. For purposes of this document, the fluid paths 82 and 94 may be referred to herein as S1 and S2 respectively.

In the illustrated embodiment, the actuators 76 and 80 are illustratively conventional electronically actuated solenoids, and the trim valves 74 and 78 are illustratively variable-bleed valves that produce variable-pressure transmission fluid at their fluid outlets based on control signals produced by the transmission control circuit 30 on the signal paths $28_2$ and $28_3$ respectively. The transmission control circuit 30 thus controls the fluid pressures within the S1 and S2 fluid paths from the VF fluid path (connected to the fault valve 68) via electronic control of the trim valves 74 and 78 respectively.

The S1 fluid path (82) is fluidly coupled to one end of a conventional damper 84, an opposite end of which is fluidly coupled to a variator high-side fluid passageway 86. In the embodiment illustrated in FIG. 3, the variator includes six actuators, $50_1$-$50_6$, e.g., conventional pistons, and the variator high-side fluid passageway 86 is fluidly coupled to one side, e.g., a high side, of each such actuator $50_1$-$50_6$ via a corresponding conventional damper $88_1$-$88_6$. A conventional check valve 85 is interposed between the variator high-side fluid passageway 86 and a control main (COM) fluid path 104, and another conventional check valve 87 is interposed between the variator high-side fluid passageway 86 and an endload fluid passageway 90.

The S2 fluid path (94) is similarly fluidly coupled to one end of another conventional damper 96, an opposite end of which is fluidly coupled to a variator low-side fluid passageway 98. The variator low-side fluid passageway 98 is fluidly coupled to an opposite side, e.g., a low side, of each actuator $50_1$-$50_6$ of the variator via a corresponding conventional damper $100_1$-$100_6$. A conventional check valve 89 is interposed between the variator low-side fluid passageway 98 and the control main (COM) fluid path 104, and another conventional check valve 102 is interposed between the variator low-side fluid passageway 98 and the endload fluid passageway 90. The endload fluid passageway 90 is fluidly coupled to an endload relief valve 92, which is further fluidly coupled between the high side and the low side of the actuator 50₆. Further details relating to one illustrative structure and method of operating the endload relief valve 92 are provided in co-pending U.S. patent application Ser. No. 61/287,020, the disclosure of which is incorporated herein by reference in its entirety.

Another conventional fluid pump 106 is configured to supply transmission fluid from the sump 64 to the clutch control section 58 of the electro-hydraulic control system 24. In the illustrated embodiment, a fluid inlet of the fluid pump 106 fluidly coupled to the sump 64 via the fluid passageway 62, and fluid outlet of the pump 106 is fluidly coupled to the fault valve 68 and to a fluid inlet of a clutch and control main regulation, cooler and lube block 110 via a fluid passageway 108. Another one of the output signal paths 28₇ of the control circuit 30 is electrically connected to the clutch and control main regulation, cooler and lube block 110. The clutch and control main regulation, cooler and lube block 110 includes conventional components, e.g., one or more valves, responsive to a control signal produced on the signal path 28₇ by the transmission control circuit 30 to supply pressure-regulated transmission fluid to a clutch main, CLM, fluid passageway 108 and to a control main, COM, fluid passageway 104 in a conventional manner. The control main fluid passageway 104 is further fluidly coupled to the fault valve 68. An exhaust backfill valve 113 establishes an exhaust backfill pressure, EB, in an exhaust backfill fluid passageway 116 that is also fluidly coupled to the clutch and control main regulation, cooler and lube block 110 and to the fault valve 68. The clutch and control main regulation, cooler and lube block 110 further includes conventional components for cooling and filtering the transmission fluid and for providing lubrication paths to the variator and to the various gears of the gear set.

The clutch main fluid passageway, CLM, is fluidly coupled to the fault valve 68, and a clutch fluid, CF, passageway 118 is fluidly coupled between the fault valve 68 and pair of clutch trim valves 120 and 122. Generally, the fault valve 68 is configured to be responsive to a control signal produced on the signal path 28₁ by the transmission control circuit 30 to control operation of the fault valve 68 to selectively supply and inhibit transmission fluid operating pressure to the variator control section 56 and to the clutch control section 58 of the electro-hydraulic control system 24 as will be described in detail hereinafter.

The clutch trim valves 120 and 122 each illustratively include an electronic actuator, e.g., an electrically controlled solenoid, 126 and 128 respectively that is electrically connected to the transmission control circuit 30 via a signal path 28₄ and 28₅ respectively. A fluid inlet of each clutch trim valve 120 and 122 is fluidly coupled to the control main, COM, fluid passageway 104. Each valve 120 and 122 is responsive to a control signal produced by the transmission control circuit 30 on the signal path 28₄ and 28₅ respectively to selectively apply or block the control main pressure, COM, to a control end of a spool 125 and 127 respectively carried by each valve 120 and 122. Each clutch trim valve 120 and 122 is further fluidly coupled to the exhaust backfill pressure, EB, passageway 116 and to the clutch fluid, CF, passageway 118. The clutch trim valve 122 is further fluidly coupled to the C2 clutch fluid path 25₂, and the clutch trim valve 122 is illustratively responsive to a control signal supplied by the transmission control circuit 30 to the actuator 128 on the signal path 28₅ to selectively activate, i.e., engage, and deactivate, i.e., disengage, the clutch C2 via the clutch fluid path 25₂. For example, in the diagram illustrated in FIG. 3, the clutch trim valve 122 is shown in its deactivated state in which the control end of the spool 127 fed by the actuator 128 is exhausted such that the spool 127 of the valve 122 fluidly couples the clutch fluid path 25₂ to the exhaust backfill, EB, pressure passageway 116, thereby deactivating or disengaging the clutch C2. In its activated state, the actuator 128 would feed the control main pressure, COM, to the control end of the spool 127 thereby causing the spool 127 to move downwardly (in FIG. 3) and fluidly couple the clutch fluid path 25₂ to the clutch fluid, CF, passageway 118, thereby activating or engaging the clutch C2.

The clutch trim valve 120 is further fluidly coupled to a clutch multiplex valve 124 via a fluid passageway 132. The clutch multiplex valve 124 illustratively includes an electronic actuator, e.g., an electrically controlled solenoid, 134 that is electrically connected to the transmission control circuit 30 via a signal path 28₆. A fluid inlet of the clutch multiplex valve 124 is fluidly coupled to the control main, COM, fluid passageway 104, and the clutch multiplex valve 124 is responsive to a control signal produced by the transmission control circuit 30 on the signal path 28₆ to selectively apply or block the control main pressure, COM, to a control end of a spool 135 carried by the valve 124. The clutch multiplex valve 124 is further fluidly coupled to the exhaust backfill pressure, EB, passageway 116 and to the C1 clutch fluid path 25₁ and the C3 fluid path 25₃.

The clutch trim valve 120 is illustratively responsive to a control signal supplied by the transmission control circuit 30 to the actuator 126 on the signal path 28₄ to selectively supply clutch fluid, CF, from the clutch fluid passageway 118 or exhaust backfill pressure, EB, from the exhaust backfill passageway 116 to the clutch multiplex valve 124. For example, in the diagram illustrated in FIG. 3, the clutch trim valve 120 is shown in its activated state in which the control end of the spool 125 fed by the actuator 126 is fed by the control main pressure, COM, such that the spool 125 of the valve 120 fluidly couples the fluid path 132 to the clutch fluid, CF, fluid passageway 118, thereby supplying clutch fluid pressure, CF, to the clutch multiplex valve 124. In its deactivated state, the actuator 126 would exhaust the control end of the spool 125 thereby causing the spool 125 to move upwardly (in FIG. 3) and fluidly couple the fluid passageway 132 to the exhaust backfill, EB, fluid passageway 116, thereby supplying exhaust backfill pressure, EB, to the clutch multiplex valve 124.

The clutch multiplex valve 124 is illustratively responsive to a control signal supplied by the transmission control circuit 30 to the actuator 134 on the signal path 28₆ to selectively couple the fluid passageway 132 to either the C1 clutch fluid path 25₁ or the C3 clutch fluid path 25₃, to thereby activate, i.e., engage, and deactivate, i.e., disengage, the clutch C1 via the clutch fluid path 25₁ or the clutch C3 via the clutch fluid path 25₃. For example, in the diagram illustrated in FIG. 3, the clutch multiplex valve 124 is shown in its deactivated state in which the control end of the spool 135 fed by the actuator 134 is exhausted such that the spool 135 of the valve 124 fluidly couples the C1 clutch fluid path 25₁ to the fluid path 132. If the trim valve 120 is in its activated position as illustrated in FIG. 3, the C1 clutch fluid path 25₁ will thus be fluidly coupled to the clutch fluid, CF, passageway 118, thereby activating or engaging the C1 clutch. At the same time, the valve 124 fluidly couples the C3 clutch fluid path 25₃ to the exhaust backfill, EB, fluid passageway 116 to thereby deactivate or disengage the C3 clutch. If, on the other hand, the trim valve 120 is in its deactivated position, the exhaust backfill, EB, pressure passageway 116, will be fluidly coupled to the C1 clutch fluid path $25_1$ and to the C3 clutch fluid path $25_3$, thereby deactivating or disengaging both of the clutches C1 and C3.

If instead the clutch multiplex valve 124 is in its activated state in which the control end of the spool 135 fed by the actuator 134 is fluidly coupled to the control main, COM, fluid passageway 104, the spool 135 of the valve 124 fluidly couples the C3 clutch fluid path $25_3$ to the fluid path 132. If the trim valve 120 is in its activated position as illustrated in FIG. 3, the C3 clutch fluid path $25_3$ would thus be fluidly coupled to the clutch fluid, CF, passageway 118, thereby activating or engaging the C3 clutch, and at the same time, the valve 124 would fluidly couple the C1 clutch fluid path $25_1$ to the exhaust backfill, EB, fluid passageway 116 to thereby deactivate or disengage the C1 clutch. If, on the other hand, the trim valve 120 is in its deactivated position, the exhaust backfill, EB, pressure passageway 116, will be fluidly coupled to the C1 clutch fluid path $25_1$ and to the C3 clutch fluid path $25_3$, thereby deactivating or disengaging both of the clutches C1 and C3.

In the embodiment illustrated in FIG. 3, the variator section 156 of the electro-hydraulic control system 24 further includes a pressure differential valve 150 including a spool 154 that is fluidly coupled at one end to the S1 fluid passageway 82, i.e., the high-side pressure of the variator actuators $50_1$-$50_6$, and at its opposite end to the S2 fluid passageway 94, i.e., the low-side pressure of the variator actuators $50_1$-$50_6$. The pressure differential valve 150 is further fluidly coupled to the control main, COM, fluid passageway 104.

In the illustrated embodiment, sensors are operatively positioned relative to each of the valves 68, 120, 122, 124 and 150 to enable monitoring of the operating states of each of these valves 68, 120, 122, 124 and 150. In one illustrative embodiment, the sensors are provided in the form of conventional pressure switches, although it will be understood that a conventional pressure sensor may be substituted for any one or more of the pressure switches. In any case, each of the pressure switches is electrically connected to the transmission control circuit 30 to allow monitoring by the transmission control circuit 30 of the states of the pressure switches and thus the operating states of the valves 68, 120, 122, 124 and 150. In the embodiment illustrated in FIG. 3, for example, a pressure switch 75 is fluidly coupled to the fault valve 68, and is electrically connected to the transmission control circuit 30 via one of the signal paths $26_1$. Another pressure switch 130 is fluidly coupled to the trim valve 120, and is electrically connected to the transmission control circuit 30 via one of the signal paths $26_2$. Still another pressure switch 136 is fluidly coupled to the multiplex valve 124, and is electrically connected to the transmission control circuit 30 via one of the signal paths $26_3$. Yet another pressure switch 142 is fluidly coupled to the trim valve 122, and is electrically connected to the transmission control circuit 30 via one of the signal paths $26_4$. Another pressure switch 152 is fluidly coupled to the pressure differential valve 150, and is electrically connected to the transmission control circuit 30 via one of the signal paths $26_5$. The transmission control circuit 30 is operable to process the signals produced by the pressure switch 75, 130, 136, 142 and 152 in a known manner to determine corresponding operating states, i.e., whether activated or deactivated, of the various valves 68, 120, 122, 124 and 150.

Figures 4, 5:
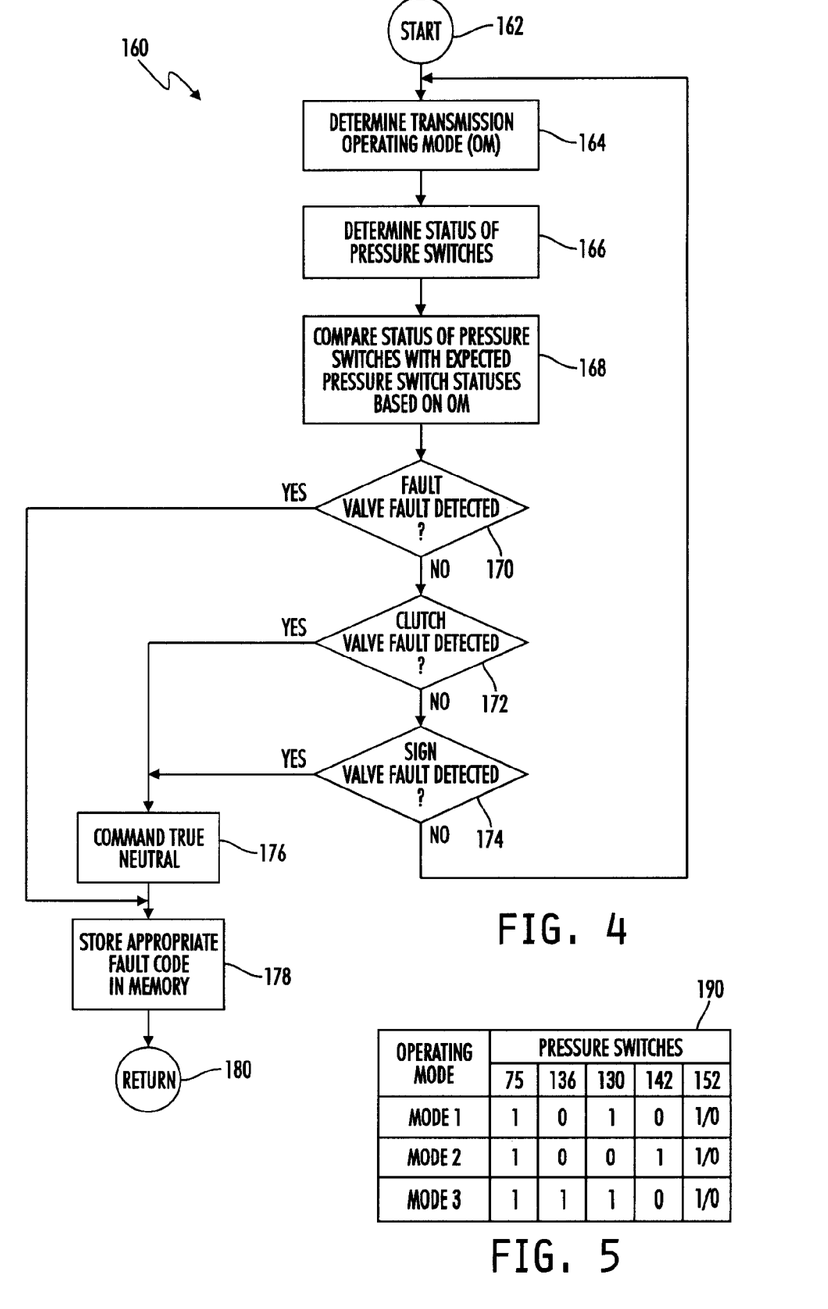
FIG. 4 is a flowchart of one illustrative embodiment of a process for monitoring certain fault states of the electro-hydraulic control system of FIG. 3 and commanding true neutral upon detection of at least some of the fault states.
FIG. 5 is a table of expected valve pressure states for the various operating modes of the transmission.

Referring now to FIG. 4, a flowchart is shown of one illustrative embodiment of a process 160 for monitoring the statuses of the various pressure switches 75, 130, 136, 142 and 152 and commanding true neutral upon detection of certain pressure switch failures or faults, and logging or storing any detected pressure switch failure or fault. The term "true neutral" is defined for purposes of this document as an operating condition of the transmission in which none of the clutches C1-C3 is activated or engaged, and corresponds to a transmission operating mode M0 identified and described hereinabove. The process 160 is illustratively stored in the memory 32 of the transmission control circuit 30 in the form of instructions that are executable by the transmission control circuit 30 to carry out the operations of the process 160 as will be described in detail hereinafter.

The process 160 begins at step 162, and thereafter at step 164 the transmission control circuit 30 is operable to determine the present operating mode, OM, of the transmission 14. Generally, as described hereinabove, the transmission 14 is operable in one of three non-neutral operating modes, M1-M3, and the operating mode of the transmission 14 at any given instant in time will depend primarily on the road speed of the vehicle carrying the transmission 14. Because the transmission control circuit 30 controls and manages the overall operation of the transmission 14, the transmission control circuit 30 will generally have knowledge at any given time of the current operating mode, OM, of the transmission 14. The transmission control circuit 30 thus executes step 164 by determining internally the current operating mode, OM, of the transmission 14. Thereafter at step 166, the transmission control circuit 30 is operable to determine the status of each pressure switch 75, 130, 136, 142 and 152, e.g., by sampling and processing the pressure switch signals produced by the pressure switches on the corresponding signal paths $26_1$-$26_5$.

Following step 166, the process 160 advances to step 168 where the transmission control circuit 30 is operable to compare the status of the pressure switches, determined at step 166, with expected pressure switch statuses based on the current operating mode of the transmission 14. Illustratively, a table or other form of expected pressure switch status values by transmission operating mode is stored in the memory 32, and the transmission control circuit 30 executes step 168 by comparing the pressure switch statuses determined at step 166 with such a table or other form of expected pressure switch status values stored in the memory 32. Referring to FIG. 5, an example is shown of one such expected pressure switch status table 190 that lists expected pressure switch status values for each of the three operating modes of the transmission.

Returning again to FIG. 4, the process 160 advances from step 168 to step 170 where the transmission control circuit 30 determines based on the comparison of step 168 whether a fault or failure associated with the fault valve 68 is detected. As illustrated in the pressure switch status table 190 of FIG. 5, the pressure switch 75 is expected to have a value of "1" for each of the three operating modes, M1-M3, of the transmission 14. Thus, if the comparison at step 168 reveals that the actual value of the pressure switch 75 is "1," then the transmission control circuit 30 determines at step 170 that no fault valve fault is detected, and the process 160 advances to step 172. Otherwise, the transmission control circuit 30 determines at step 170 that a fault valve fault exists and the process 160 advances to step 178 where the transmission control circuit 30 stores or logs an appropriate fault code in the memory 32.

At step 172 the transmission control circuit 30 determines based on the comparison of step 168 whether a fault or failure associated with the clutch valves 120, 122 and 124 is detected. As illustrated in the pressure switch status table 190 of FIG. 5, the pressure switches 136, 130 and 142 are expected to have the values "0 1 0" respectively for mode 1, the values "0 0 1" respectively for mode 2 and the values "1 1 0" respectively for mode 3. If the comparison at step 168 reveals that the actual values of the pressure switches 136, 130 and 142 match the expected values for the current operating mode of the transmission 14, then the transmission control circuit 30 determines at step 172 that no clutch valve fault is detected, and the process 160 advances to step 174. Otherwise, the transmission control circuit 30 determines at step 172 that a clutch valve fault exists and the process 160 advances to step 176 where the transmission control circuit 30 commands true neutral. Illustratively, the transmission control circuit 30 is operable to command true neutral by deactivating or destroking the fault valve 68, thereby forcing the transmission 14 to a true neutral condition if at least one of the actual values of the pressure switches 136, 130 and 142 is different from a corresponding one of the expected values of the pressure switches 136, 130 and 142.

Figure 6:
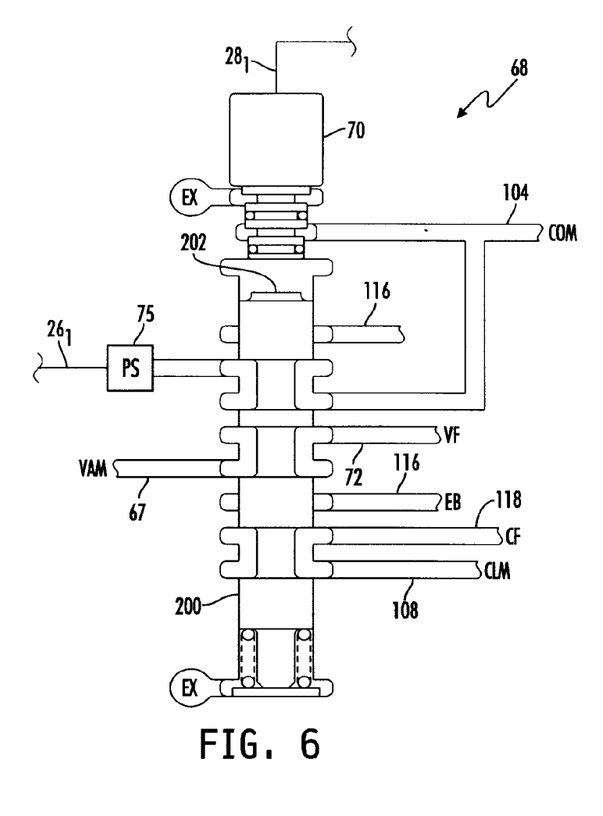
FIG. 6 is a magnified view of the fault valve illustrated in FIG. 3 showing one operating state thereof.
Figure 7:
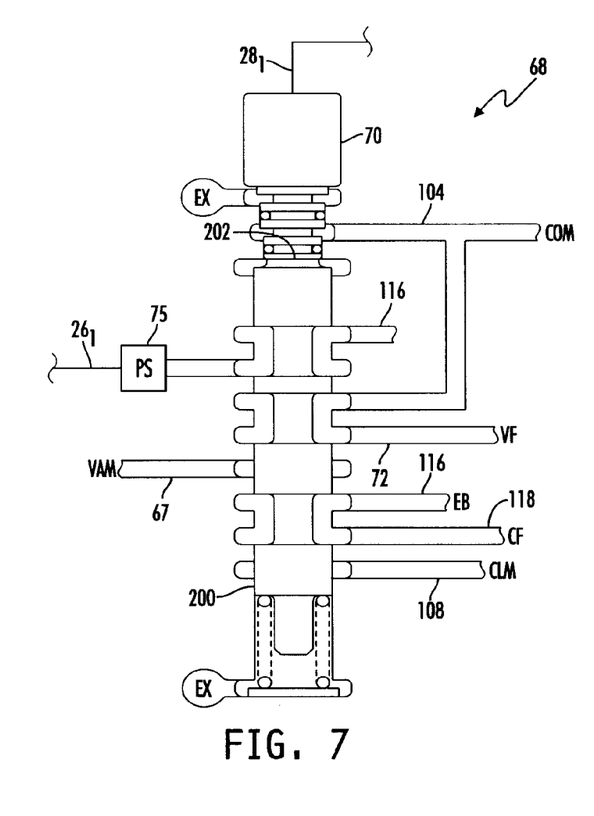
FIG. 7 is another magnified view of the fault valve illustrated in FIG. 3 showing an opposite operating state thereof.

Referring now to FIGS. 6 and 7, magnified views of the fault valve 68 are shown in which FIG. 6 illustrates the fault valve 68 in its activated or stroked position (as also illustrated in FIG. 3), and in which FIG. 7 illustrates the fault valve 68 in its deactivated or unstroked position. In its activated or stroked position illustrated in FIG. 6, the spool 200 is forced by the control main pressure, COM, applied to its control end 202 to be positioned within the fault valve 68 to cause the variator main pressure, VAM, to be fluidly coupled to the variator fluid (VF) passageway 116, to cause the clutch main pressure, CLM, to be fluidly coupled to the clutch fluid, CF, passageway 118 and to cause the control main pressure, COM, to be fluidly coupled to the pressure switch 75 such that the pressure switch 75 produces a logic high signal, or "1." In this normally activated or stroked position, the fault valve 68 thus feeds the variator main pressure, VAM, to the two variator trim valves 74 and 78 via the fluid passageway 72, and feeds the clutch main pressure, CLM, to the two clutch trim valves 120 and 122 via the fluid passageway 118 (see FIG. 3).

In its deactivated or unstroked position illustrated in FIG. 7, the control end 202 of the spool is exhausted and the spool 200 is thereby forced to be positioned within the fault valve 68 to cause the control main pressure, COM, to be fluidly coupled to the variator fluid (VF) passageway 116, to cause the exhaust backfill pressure, EB, to be fluidly coupled to the clutch fluid, CF, passageway 118 and to cause the exhaust backfill pressure, EB, to also be fluidly coupled to the pressure switch 75 such that the pressure switch 75 produces a logic low signal, or "0." In this deactivated or unstroked position, the fault valve 68 thus feeds the control main pressure, COM, to the two variator trim valves 74 and 78 via the fluid passageway 72, and feeds the exhaust backfill pressure, EB, to the two clutch trim valves 120 and 122 via the fluid passageways 116 and 118. Referring again to FIG. 3, with the exhaust backfill pressure, EB, supplied to the fluid path 118, none of the clutches C1-C3 can be activated or engaged regardless of the operating states of any of the clutch valves 120, 122 and 124, and the transmission 14 is thereby in the true neutral state.

Referring again to FIG. 4, the process 160 advances from step 176 to step 178 where the transmission control circuit 30 stores or logs an appropriate fault code in the memory 32, i.e., a fault code appropriate for a clutch valve fault or failure. The stored or logged fault code may include information only as to the existence of a clutch valve fault or failure, information relating to which transmission operating mode was active, i.e., mode 1, 2 or 3, when the clutch valve fault or failure was detected, information relating to the specific pressure switch for which the fault or failure was detected, and/or whether the clutch valve failure or fault occurred because the monitored state of the pressure switch in question was a "1" when a "0" was expected or vice versa.

Figure 8:
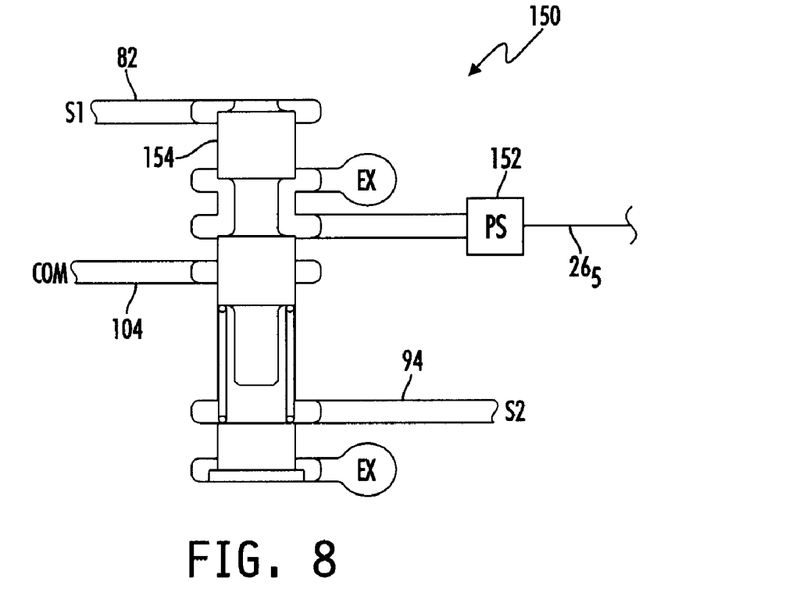
FIG. 8 is a magnified view of the sign valve illustrated in FIG. 3 showing one operating state thereof.
Figure 9:
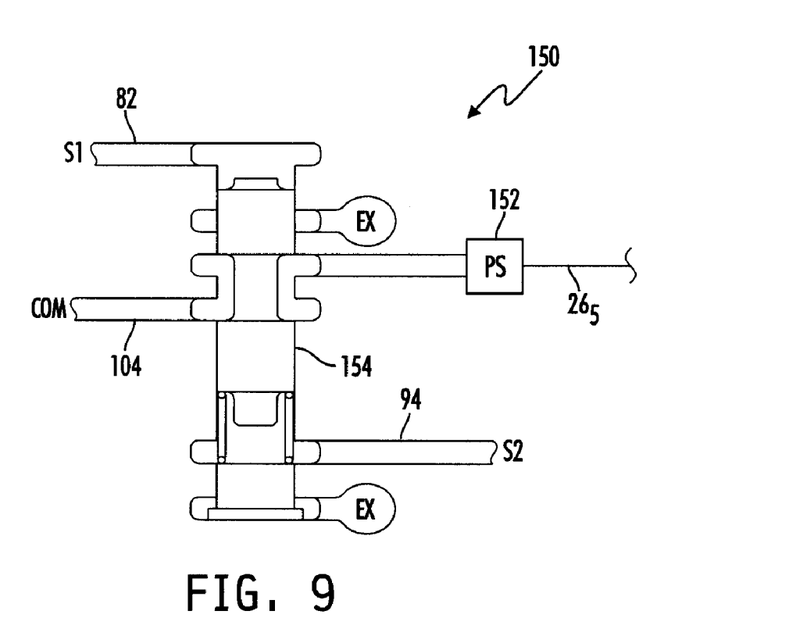
FIG. 9 is another magnified view of the sign valve illustrated in FIG. 3 showing an opposite operating state thereof.

At step 174 the transmission control circuit 30 determines, based on the comparison of step 168, whether a fault or failure associated with the pressure differential valve 150 is detected. As illustrated in the pressure switch status table 190 of FIG. 5, the pressure switch 152 may have a value of "1" or "0" in each of the three operating modes. Referring now to FIGS. 8 and 9, magnified views of the pressure differential valve 150 are shown illustrating the two opposite states of the pressure switch 152. In FIG. 8, for example, which is also the state of the valve 150 illustrated in FIG. 3, the spool 154 is driven upwardly, indicating that the pressure S2 is greater than that of S1, which means that the low-side pressure applied to the variator actuators $50_1$-$50_2$ via the fluid passageway 98 is greater than the high-side pressure applied to the variator actuators $50_1$-$50_6$ via the fluid passageway 86. In this position, the spool 154 fluidly couples the pressure switch 152 to exhaust, and in this position the pressure switch 152 thus produces a logic low signal or "0." In FIG. 9, in contrast, the spool 154 is driven downwardly, indicating that the pressure S1 is greater than that of S2, which means that the high-side pressure applied to the variator actuators $50_1$-$50_6$ via the fluid passageway 86 is greater than the low-side pressure applied to the low-side pressure applied to the variator actuators $50_1$-$50_6$ via the fluid passageway 98. In this position, the spool 154 fluidly couples the pressure switch 152 to the control main pressure, COM, and in this position the pressure switch 152 thus produces a logic high signal or "1." Illustratively, the pressure differential valve 150 is designed to have a specified amount of hysteresis between the switching states of the pressure switch 152, and in one embodiment the hysteresis is approximately 15-20% such that the differential pressure between S1 and S2 must be greater than about 15-20% before the pressure switch 152 changes state. Those skilled in the art will appreciate that this hysteresis value is provided only by way of example and that other hysteresis values, or no hysteresis value, may alternatively be used.

As with the operating modes, M1-M3, the transmission control circuit 30 likewise controls and manages the operation of the variator, and the transmission control circuit 30 thus has knowledge of whether the operating torque of the variator is positive or negative at any given instant in time based on current transmission operating conditions. Illustratively, a positive operating torque of the variator occurs when the differential pressure valve 150 is positioned such that the pressure switch 152 produces a "1," e.g., as illustrated in FIG. 9, and a negative operating torque of the variator occurs when the differential pressure valve 150 is positioned such that the pressure switch 152 produces a "0," e.g., as illustrated in FIG. 8, although the pressure differential valve may alternatively be designed such that the pressure switch 152 produces a "1" during periods of negative variator torque and produces a "0" during periods of positive variator torque. The transmission control circuit 30 can thus determine from the state of the pressure differential valve, e.g., from the state of the pressure switch 152, a variator torque sign corresponding to whether torque transferred by the at least one roller to the variator is positive or negative. Because the transmission control circuit 30 has knowledge of whether the operating torque of the variator is positive or negative, the transmission control circuit 30 accordingly has knowledge of the expected value of the pressure switch 152 at any instant in time. If, at step 168, the comparison reveals that the actual value of the pressure switch 152 matches the expected value of the pressure switch 152, then the transmission control circuit 30 determines at step 174 that no pressure differential valve fault is detected, and the process 160 loops back to step 164. Otherwise, the transmission control circuit 30 determines at step 174 that a pressure differential valve fault exists and the process 160 advances to step 176 where the transmission control circuit 30 commands true neutral as described hereinabove. Thereafter at step 178, the transmission control circuit 30 stores or logs a fault code corresponding to a differential pressure valve fault or failure. The stored or logged fault code may include information only as to the existence of a differential pressure valve fault or failure, and/or may include information relating to whether the differential pressure valve fault or failure occurred because the monitored state of the pressure switch 152 was a "1" when a "0" was expected or vice versa.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A fail-to-neutral diagnostic method for a transmission including a variator, the method comprising:
    monitoring operating states of a plurality of clutch control valves each fluidly coupled to a corresponding gear engagement clutch of the transmission,
    determining expected operating states of each of the plurality of clutch control valves based on current operating conditions of the transmission, and
    forcing the transmission to a true neutral condition if a monitored operating state of at least one of the plurality of clutch control valves is different from a corresponding one of the expected operating states.

2. The method of claim 1 wherein the transmission has a plurality of operating modes each operable in a different road speed range of a vehicle carrying the transmission,
    and wherein determining expected operating states of each of the plurality of clutch control valves comprises determining which of the plurality of operating modes the transmission is currently operating in, and determining the expected operating states of each of the plurality of clutch control valves for the current operating mode of the transmission based on the current operating conditions of the transmission.

3. The method of claim 2 further comprising:
    logging a fault code in a memory unit if a monitored operating state of at least one of the plurality of clutch control valves is different from a corresponding one of the expected operating states, and
    including in the fault code information indicative of a current one of a plurality of different operating modes of the transmission.

4. The method of claim 1 further comprising logging a fault code in a memory unit if a monitored operating state of at least one of the plurality of clutch control valves is different from a corresponding one of the expected operating states.

5. The method of claim 4 further comprising including in the fault code information identifying which of the plurality of clutch control valves has a monitored operating state that is different from a corresponding expected operating state.

6. The method of claim 1 further comprising a plurality of pressure switches each fluidly coupled to a different one of the plurality of clutch control valves and each configured to assume an operating state depending upon the operating state of a corresponding one of the plurality of clutch control valves,
    wherein monitoring operating states of a plurality of clutch control valves comprises monitoring operating states of each of the plurality of pressure switches,
    and wherein determining expected operating states of each of the plurality of clutch control valves comprises determining expected operating states of each of the plurality of pressure switches.

7. A fail-to-neutral diagnostic system for a transmission including a variator, the system comprising:
    a plurality of clutch control valves each fluidly coupled to a corresponding gear engagement clutch of the transmission,
    a plurality of pressure switches each fluidly coupled to a different one of the plurality of clutch control valves, and
    a control circuit including a memory having instructions stored therein that are executable by the control circuit to determine from the plurality of pressure switches actual operating states of each of the plurality of clutch control valves, to determine expected operating states of each of the plurality of clutch control valves based on current operating conditions of the transmission, and to force the transmission to a true neutral condition if an actual operating state of at least one of the plurality of clutch control valves is different from a corresponding one of the expected operating states.

8. The system of claim 7 wherein each of the plurality of pressure switches is configured to assume an operating state depending upon the operating state of a corresponding one of the plurality of clutch control valves,
    and wherein the instructions stored in the memory include instructions that are executable by the control circuit to determine from the plurality of pressure switches actual operating states of each of the plurality of clutch control valves by monitoring operating states of each of the plurality of pressure switches, and to determine expected operating states of each of the plurality of clutch control valves by determining expected operating states of each of the plurality of pressure switches.

9. The system of claim 7 wherein the transmission has a plurality of operating modes each operable in a different road speed ranges of a vehicle carrying the transmission,
    and wherein the instructions stored in the memory include instructions that are executable by the control circuit to determine expected operating states of each of the plurality of clutch control valves by determining which of the plurality of operating modes the transmission is currently operating in, and then determining the expected operating states of each of the plurality of clutch control valves for the current operating mode of the transmission based on the current operating conditions of the transmission.

10. The system of claim 9 wherein the instructions stored in memory include instructions that are executable by the control circuit to log a fault code in the memory if an actual operating state of at least one of the plurality of clutch control valves is different from a corresponding one of the expected operating states,
    and wherein the instructions stored in memory include instructions that are executable by the control circuit to include in the fault code information indicative of a current one of a plurality of different operating modes of the transmission.

11. The system of claims 7 wherein the instructions stored in memory include instructions that are executable by the control circuit to log a fault code in the memory if an actual operating state of at least one of the plurality of clutch control valves is different from a corresponding one of the expected operating states.

12. The system of claim 11 wherein the instructions stored in memory include instructions that are executable by the control circuit to include in the fault code information identifying which of the plurality of clutch control valves has an actual operating state that is different from a corresponding expected operating state.

* * * * *